US012766559B2

(12) United States Patent
Xia et al.

(10) Patent No.: US 12,766,559 B2
(45) Date of Patent: Oct. 20, 2026

(54) THREE-DIMENSIONAL SORTING CONTROL METHOD, THREE-DIMENSIONAL SORTING ROBOT AND RELATED DEVICE

(71) Applicant: LIBIAO ROBOTICS HOLDINGS PTE. LTD., Oue Downtown (SG)

(72) Inventors: Huiling Xia, Hangzhou (CN); Jianqiang Zhu, Hangzhou (CN); Juejing Xu, Hangzhou (CN); Ming Ma, Hangzhou (CN)

(73) Assignee: Libiao Robotics Holdings PTE. LTD., Oue Downtown (SG)

( * ) Notice: Subject to any disclaimer, the term of this patent is extended or adjusted under 35 U.S.C. 154(b) by 290 days.

(21) Appl. No.: 18/699,622

(22) PCT Filed: Mar. 31, 2022

(86) PCT No.: PCT/CN2022/084625
§ 371 (c)(1),
(2) Date: Apr. 9, 2024

(87) PCT Pub. No.: WO2023/065605
PCT Pub. Date: Apr. 27, 2023

(65) Prior Publication Data

US 2024/0408647 A1 Dec. 12, 2024

(30) Foreign Application Priority Data

Oct. 20, 2021 (CN) ........................ 202111220181.5

(51) Int. Cl.

| | |
|---|---|
| ***G06F 7/00*** | (2006.01) |
| ***B07C 3/00*** | (2006.01) |
| ***B07C 3/02*** | (2006.01) |

(52) U.S. Cl.
CPC .............. *B07C 3/006* (2013.01); *B07C 3/008* (2013.01); *B07C 3/02* (2013.01)

(58) Field of Classification Search
CPC ........... B07C 3/00; B07C 3/003; B07C 3/005; B07C 3/006; B07C 3/008; B07C 3/06;
(Continued)

(56) References Cited

U.S. PATENT DOCUMENTS

| | | | |
|---|---|---|---|
| 2020/0047218 | A1 | 2/2020 | Cherry et al. |
| 2020/0216265 | A1 | 7/2020 | Theobald |
| 2021/0188553 | A1 | 6/2021 | Blotnik et al. |

FOREIGN PATENT DOCUMENTS

| | | | |
|---|---|---|---|
| CN | 106311615 | A | 1/2017 |
| CN | 108465641 | A | 8/2018 |

(Continued)

OTHER PUBLICATIONS

International Search Report and the Written Opinion of the International Searching Authority for International Application No. PCT/CN2022/084625 mailed May 17, 2022, pp. 1-8.

(Continued)

*Primary Examiner* — Yolanda R Cumbess
(74) *Attorney, Agent, or Firm* — Warner Norcross + Judd LLP

(57) ABSTRACT

A sorting control method for a three-dimensional sorting robot, a three-dimensional sorting robot and a related device are provided. The method comprises: a state acquisition step, involving acquiring the state of a target goods basket unit of the current sorting shelf; a delivery step, involving controlling, when it is confirmed that the target goods basket unit is available, an unloading mechanism of a three-dimensional sorting robot to execute a first delivery action; a determination step, involving determining whether goods to be delivered enter the target goods basket unit, and when a (Continued)

delivery failure occurs, controlling the unloading mechanism of the three-dimensional sorting robot to execute a second delivery action; and a confirmation step, involving executing the determination step once or multiple times, until it is confirmed that the goods to be delivered are delivered into the target goods basket unit.

20 Claims, 7 Drawing Sheets

(58) Field of Classification Search
CPC .... B07C 3/02; B07C 3/18; B07C 3/10; B07C 5/00; B07C 5/04; B07C 5/16; B07C 5/34; B07C 5/36; B07C 2501/0063; B07C 2301/0016; G05B 2219/45045; G05B 2219/45047; B25J 9/1679; Y02P 90/02; G06Q 10/08; G06Q 10/087; B65G 1/00; B65G 1/02; B65G 1/04; B65G 1/0485; B65G 1/0492; B65G 1/06; B65G 1/065; B65G 1/137; B65G 1/1371; B65G 1/1373; B65G 1/1378
USPC ................................ 700/213, 223–224, 226
See application file for complete search history.

(56) References Cited

FOREIGN PATENT DOCUMENTS

| | | | | | |
|---|---|---|---|---|---|
| CN | 108527322 | A | | 9/2018 | |
| CN | 109092719 | A | | 12/2018 | |
| CN | 109675818 | A | | 4/2019 | |
| CN | 109697479 | A | | 4/2019 | |
| CN | 110624835 | A | | 12/2019 | |
| CN | 210162595 | U | | 3/2020 | |
| CN | 11159661 | A | | 8/2020 | |
| CN | 111573112 | A | | 8/2020 | |
| CN | 111591661 | A | | 8/2020 | |
| CN | 111822366 | A | | 10/2020 | |
| CN | 112108386 | A | | 12/2020 | |
| CN | 113894048 | A | | 1/2022 | |
| JP | 2002-000363 | A | | 1/2002 | |
| JP | 2009-040556 | A | | 2/2009 | |
| JP | 2012-197123 | A | | 10/2012 | |
| JP | 5692684 | B1 | | 4/2015 | |
| JP | 2019025566 | A | | 2/2019 | |
| JP | 2019141770 | A | | 8/2019 | |
| JP | 6897896 | B2 | | 7/2021 | |
| WO | 2020/208658 | A2 | | 10/2020 | |
| WO | WO-2023134050 | A1 | * | 7/2023 | ............... F24H 7/00 |

OTHER PUBLICATIONS

Chinese Patent Office Search Report of the Priority Application No. CN 2021112201815, p. 1.
Notification of Grant of Invention Patent Right for Chinese Application No. 202111220181.5 with English translation, mailed Dec. 11, 2023, pp. 1-8.
The Second Office Action for Chinese Application No. 202111220181.5 with English translation, mailed Aug. 10, 2023, pp. 1-24.
Decision to Grant for Japanese Application No., 2024-519242 with English translation, dated Aug. 8, 2025, pp. 1-5.
Notice of Reasons for Refusal for Japanese Application No., 2024-519242 with English translation, dated Apr. 22, 2025, pp. 1-6.
Request for the Submission of an Opinion for Korean Application No. 10-2024-7012450 with English translation, dated Aug. 29, 2025, pp. 1-7.
Written Decision on Registration for Korean Application No. 10-2024-7012450 with English translation, mailed May 29, 2026, pp. 1-11.
First Office Action for Taiwan Application No. 111118458 with English translation, mailed Jan. 15, 2024, pp. 1-17.
Notification to Grant for Taiwan Application No. 111118458 with English translation, mailed May 13, 2024, pp. 1-17.
European Search Report for Application 22882230.0 mailed Dec. 13, 2024, pp. 1-5.
European Communication for Application 22882230.0 mailed Jan. 3, 2025, pp. 1-8.

* cited by examiner

THREE-DIMENSIONAL SORTING CONTROL METHOD, THREE-DIMENSIONAL SORTING ROBOT AND RELATED DEVICE

CROSS-REFERENCE TO RELATED APPLICATIONS

The present disclosure claims priority to the Chinese patent application No. 202111220181.5 filed with the China National Intellectual Property Administration on Oct. 20, 2021, and entitled "THREE-DIMENSIONAL SORTING CONTROL METHOD, THREE-DIMENSIONAL SORTING ROBOT AND RELATED DEVICE", all the contents of which are incorporated herein by reference in entirety.

TECHNICAL FIELD

The present disclosure relates to the technical field of sorting robots, and particularly to sorting of a three-dimensional sorting robot, a three-dimensional sorting robot and a related device.

BACKGROUND ART

A sorting robot is a robot that is equipped with a sensor and a recognition mechanism and executes sorting actions, for quickly sorting of goods. Existing sorting robots are divided into platform-type sorting robots or sorting mechanical arms. At a distribution center, express packages are taken from bags and placed on a conveyor belt, moved to positions of corresponding sorting bags at a destination, and rolled down from the conveyor belt or grasped and thrown into the sorting bags at the destination, thereby completing the sorting.

In the prior art, a planar sorting system may complete the sorting efficiently after deployment. As for a three-dimensional sorting system, it is increasingly applied as it can better improve sorting efficiency. The current three-dimensional sorting system has the problem of unreliable delivery of goods that fail to be thrown into goods baskets during the delivery to sorting shelves and the goods baskets in the three-dimensional sorting process.

SUMMARY

Embodiments of the present disclosure provide sorting of a three-dimensional sorting robot, a three-dimensional sorting robot and a related device, so as to improve the sorting efficiency and ensure reliable delivery of goods.

A sorting control method for a three-dimensional sorting robot, wherein the sorting control method may include:

- a state acquisition step, involving acquiring a state of a target goods basket unit of a current sorting shelf, wherein,
- the three-dimensional sorting robot may have a binding relationship with identity information of the target sorting shelf, and the binding relationship may be associated with a target order; under sorting tasks of the target order, to-be-sorted goods are sorted by the three-dimensional sorting robot according to identity information of the shelf, wherein the identity information may include a correspondence relationship between order goods and the target goods basket unit;
- a delivery step, involving controlling, when it is confirmed that the target goods basket unit is available, an unloading mechanism of the three-dimensional sorting robot to execute a first delivery action;
- a determination step, involving determining whether to-be-delivered goods enter the target goods basket unit, and controlling, when a delivery failure occurs, the unloading mechanism of the three-dimensional sorting robot to execute a second delivery action; and
- a confirmation step, involving executing the determination step one or more times, until it is confirmed that the to-be-delivered goods are delivered into the target goods basket unit.

Optionally, the step of acquiring a state of a target goods basket unit of a current sorting shelf may be configured as:

- confirming whether the target goods basket unit is located in a fixed position of the target sorting shelf;
- when the target goods basket unit is located in the fixed position, it is determined whether the target goods basket unit has a broken part unable to receive delivered goods,
- if the target goods basket unit can receive goods normally, the delivery step is performed.

Optionally, the step of determining whether to-be-delivered goods enter the target goods basket unit may include:

- acquiring, by a scanning device or an image acquisition device, a light feedback result or an image analysis result of whether the target goods basket unit has received the goods;
- when the light feedback result or the image analysis result indicates that the goods are not in a first detection position in the target goods basket unit, it is determined that the delivery failure occurs.

Optionally, the confirmation step may include:

- lifting the scanning device or the image acquisition device to a preset position by using a lifting function equipped to the unloading mechanism, so as to acquire the light feedback result or the image analysis result again;
- when the light feedback result or the image analysis result indicates that the goods are not in a second detection position in the target goods basket unit, it is determined that the delivery failure occurs.

Optionally, the step of confirming whether the target goods basket unit is located in a fixed position of the target sorting shelf may include:

- acquiring, by a scanning device or an image acquisition device, whether the target goods basket unit is located in the fixed position of the target sorting shelf;
- if the light feedback result or image analysis result indicates that the target goods basket unit does not exist in the fixed position, the unloading mechanism of the three-dimensional sorting robot is controlled to stop a delivery action.

Optionally, the state acquisition step further may include: acquiring attribute data of goods basket units of the sorting shelf, wherein the attribute data may include: size data, volume data and type data.

Optionally, the three-dimensional sorting robot may have a binding relationship with the identity information of the target sorting shelf, and the identity information of the target sorting shelf is acquired by the three-dimensional sorting robot using an RFID reader, which may include:

- reading a label provided on the target sorting shelf to acquire the identity information, wherein the label may at least carry structure data of the sorting shelf and position information of the goods basket unit, wherein,
- the structure data of the sorting shelf may indicate information of longitudinal and transverse structures and available goods baskets of the sorting shelf; and the position information of the goods basket unit may indicate a position of the goods basket unit in a coordinate system formed by the sorting shelf.

Optionally, the three-dimensional sorting robot sorts the to-be-sorted goods according to the identity information of the shelf, which may include:

analyzing sorting information of the to-be-sorted goods, wherein the sorting information may carry a correspondence relationship with certain goods basket unit in the sorting shelf;

looking up the correspondence relationship table, so as to acquire coordinate values of the goods basket unit in a three-dimensional coordinate system formed by the sorting shelf; and indexing the coordinate values and positioning, and delivering the to-be-sorted goods to the goods basket unit.

A three-dimensional sorting robot, wherein the three-dimensional sorting robot may be configured in a three-dimensional sorting system, and the three-dimensional sorting robot is provided with a control module, for executing the three-dimensional sorting control method as described above.

Optionally, the three-dimensional sorting robot may have a binding relationship with the identity information of the target sorting shelf, and the binding relationship may be associated with the target order; under the sorting tasks of the target order, the to-be-sorted goods are sorted according to the identity information of the shelf.

A three-dimensional sorting control system, wherein the three-dimensional sorting control system may be configured in a three-dimensional sorting system, and the three-dimensional sorting control system may execute the three-dimensional sorting control method as described above.

Optionally, the three-dimensional sorting control system may complete control by one or more groups of servers, or the three-dimensional sorting control system may be provided with a master computer or a centralized controller, for allocating sorting tasks to the three-dimensional sorting robot.

Optionally, the server may store the identity information of each sorting shelf or goods basket, and store and update a relationship between the three-dimensional sorting robot and an order in execution, a bound three-dimensional sorting shelf or goods basket.

Optionally, the three-dimensional sorting system may be provided with one or more planar sorting robots, wherein the planar sorting robots may cooperate with the three-dimensional sorting robot, and the planar sorting robots may execute goods delivery to the three-dimensional sorting robot based on the target order.

A computing device, which may include: at least one processor; and a memory in communication connection with the at least one processor, wherein, the memory stores instructions that may be executed by the at least one processor, so that the at least one processor can execute the three-dimensional sorting control method as described above.

The present disclosure discloses the sorting control method for a three-dimensional sorting robot, the three-dimensional sorting robot or the related device, including the state acquisition step; the delivery step, involving executing the first delivery action when it is confirmed that the target goods basket unit is available; the determination step, involving executing the second delivery action when the delivery failure occurs; and the confirmation step, involving executing the determination step once or multiple times, until it is confirmed that the to-be-delivered goods are delivered into the target goods basket unit. By the present sorting control method, in conjunction with cooperation of detection and recognition apparatuses, control apparatus and unloading apparatus of the three-dimensional sorting robot, and through multiple times of confirmation and determination of whether the goods are delivered successfully according to the state of the goods basket units, it is ensured that the three-dimensional sorting robots quickly participate in the sorting, thus achieving the technical objective of greatly improving reliability of successful delivery of the three-dimensional sorting robots while improving the overall sorting efficiency.

BRIEF DESCRIPTION OF THE DRAWINGS

The drawings described herein are used to provide further understanding to the present disclosure and form a part of the present disclosure. Illustrative embodiments of the present disclosure and the description thereof are used to explain the present disclosure and do not constitute improper limitations to the present disclosure. In the drawings.

DETAILED DESCRIPTION OF EMBODIMENTS

Embodiments of the present disclosure provide sorting of a three-dimensional sorting robot, a three-dimensional sorting robot and a related device, achieving technical objectives of improving sorting efficiency and delivering goods reliably.

Figure 1A:
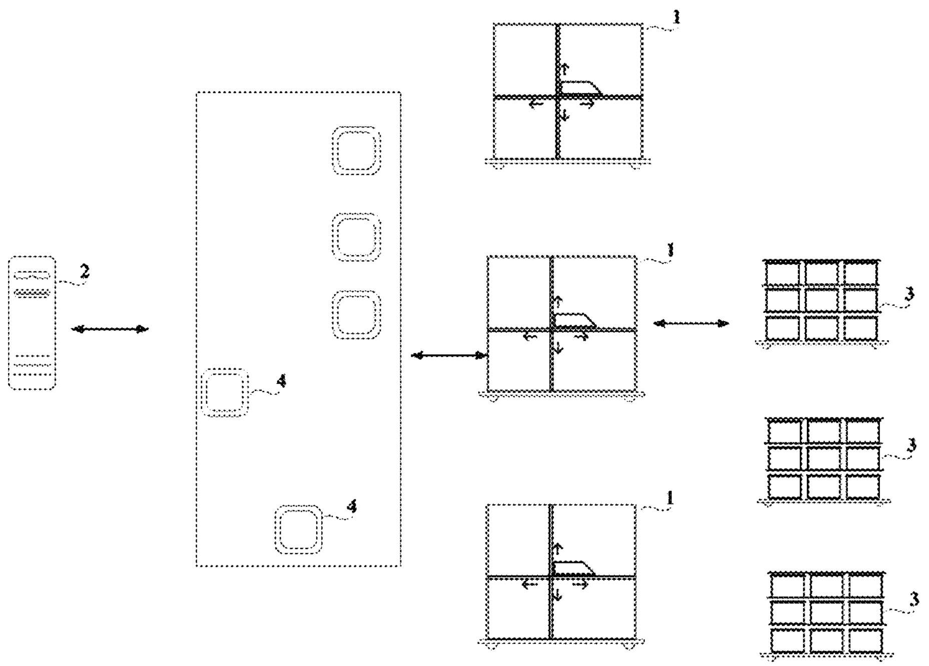
FIG. 1*a* is a structural schematic diagram of a three-dimensional sorting system in embodiments of the present disclosure.

For ease of understanding, the embodiments of the present disclosure are described on the basis of the structure of FIG. 1*a*, but this does not mean that the structure shown in FIG. 1*a* is a condition limiting the scope of the present disclosure.

A three-dimensional sorting system provided in embodiments of the present disclosure is described below with reference to FIG. 1*a*. In the present disclosure, there are a plurality of three-dimensional sorting robots 1, a server 2 and sorting shelves 3. The three-dimensional sorting robots 1 may have a support frame structure, and execute recognition and sorting tasks on the sorting shelves having a multilayer three-dimensional structure through a transverse movable mechanism and a longitudinal movable mechanism. Meanwhile, the three-dimensional sorting robots 1 each may be provided with a rotation plate or an unloading mechanism assembly for delivering goods to the sorting shelves. They may cooperate with desktop sorting robots or planar sorting robots 4 for sorting tasks based on orders of a certain wave. The server 2 is used to control sorting waves, sorting orders, and a plurality of three-dimensional sorting robots within the local area network or region, and meanwhile establish a binding relationship between the three-dimensional sorting robots and the sorting shelves for certain orders of a certain wave. In the present disclosure, the server may complete the control and state query to the sorting robots in the three-dimensional sorting system in a wired or wireless manner, which includes, but is not limited to, a control manner with a bus.

Figure 1B:
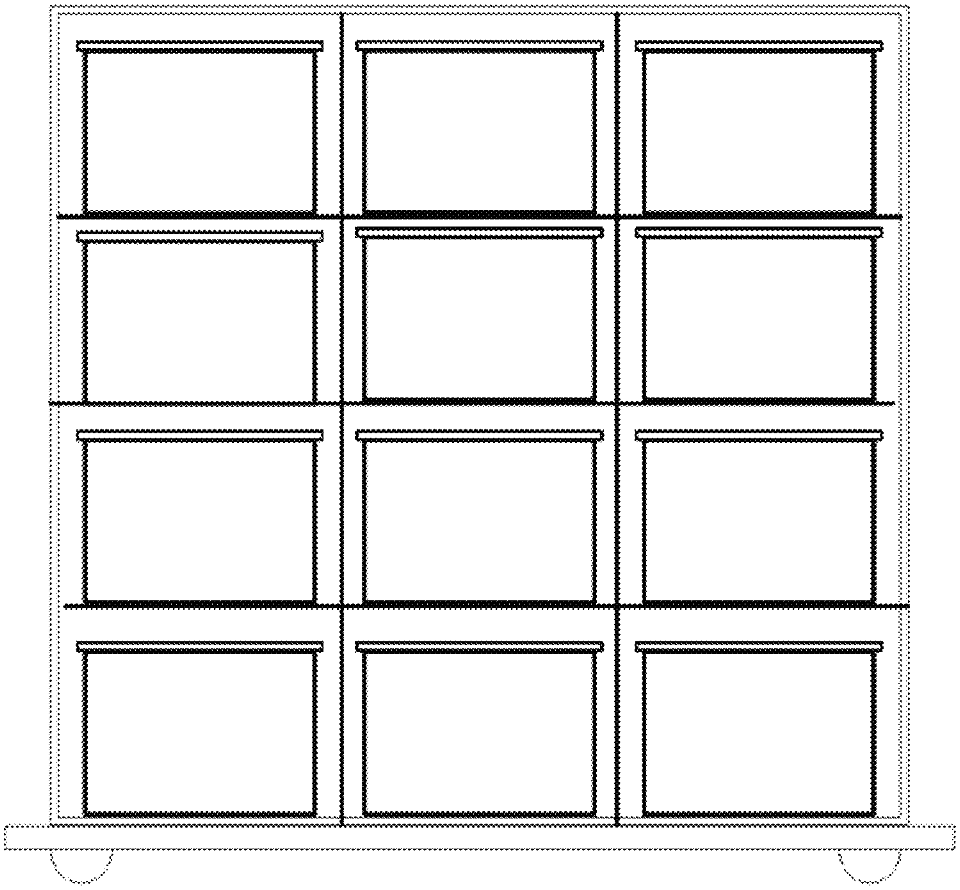
FIG. 1*b* is a structural schematic diagram of a three-dimensional sorting shelf in embodiments of the present disclosure.
Figure 1C:
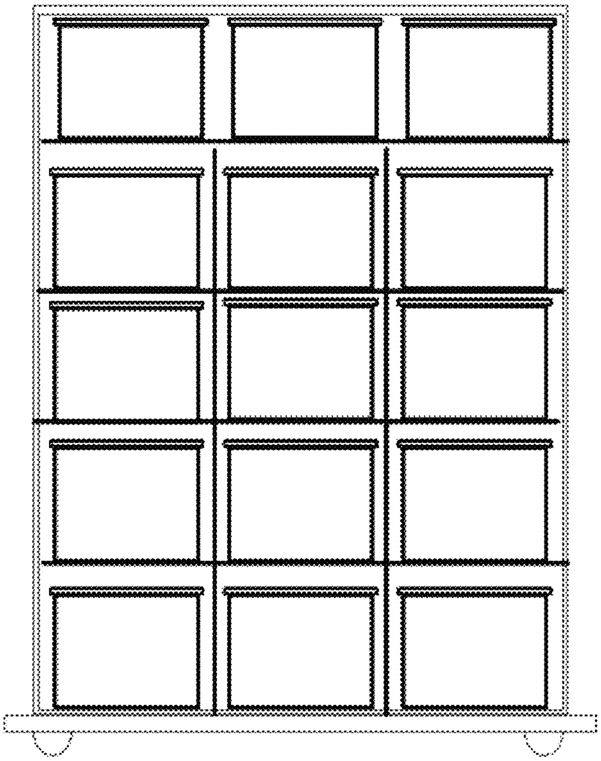
FIG. 1*c* is a structural schematic diagram of the three-dimensional sorting shelf in embodiments of the present disclosure.

With reference to FIGS. 1*b*-1*c*, in the present disclosure, the sorting shelves may be sorting shelves or goods baskets of any structure or shape, conventional sorting shelves or goods baskets may be configured according to different goods or different sorting lines, structures of the sorting shelves are usually not unified, and even a plurality of shelves are spliced. In existing circumstances where the sorting shelves or goods baskets are not limited, the sorting robots need to perform goods sorting reliably in cases where there are a variety of structure types and the goods basket units may be broken or missing. However, the sorting robots in the prior art cannot ensure successful delivery.

Figure 1D:
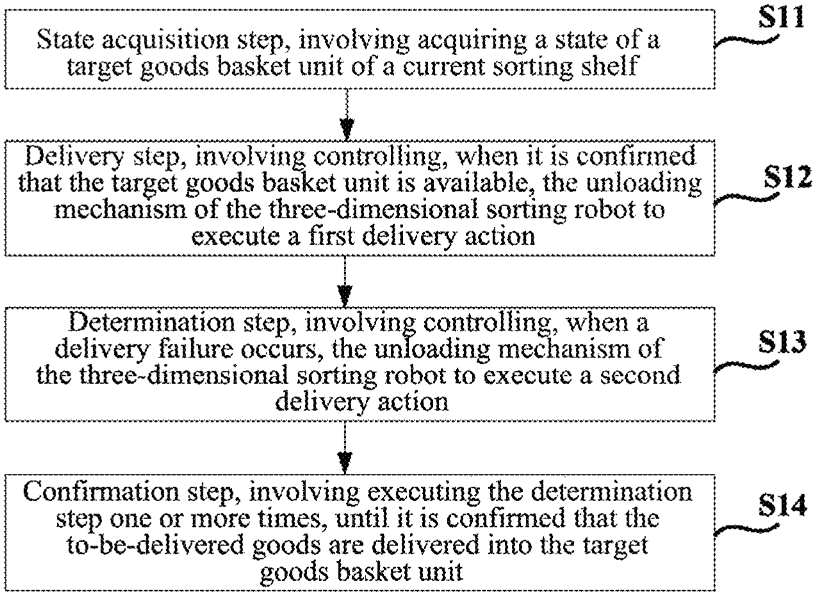
FIG. 1*d* is a schematic flowchart of a sorting control method for a three-dimensional sorting robot in embodiments of the present disclosure.

Based on this, referring to FIG. 1*d*, a sorting control method for a three-dimensional sorting robot of the present disclosure includes:

S11: a state acquisition step, involving acquiring a state of a target goods basket unit of a current sorting shelf;

In this step, it is required to first detect and confirm whether the target goods basket unit exists in a fixed position of the sorting shelf, and/or whether a breakage condition of the target goods basket unit may support goods delivery, and whether the target goods basket unit is in a state of being overfilled and unable to receive more goods or other states.

More specifically, confirming whether the target goods basket unit is located in a fixed position of the target sorting shelf is specifically implemented as follows:

acquiring, by a scanning device or an image acquisition device, whether the target goods basket unit is located in the fixed position of the target sorting shelf, wherein if the light feedback result or image analysis result indicates that the target goods basket unit does not exist in the fixed position, unloading mechanism of the three-dimensional sorting robot is controlled to stop a delivery action.

Optionally, if the light feedback result or the image analysis result indicates that the target goods basket unit has reached a delivery space limit, the unloading mechanism of the three-dimensional sorting robot is controlled to stop the delivery action.

Certainly, in the above cases, goods-based configuration also may be performed in combination with a situation of orders of the present wave, for example, as for goods with a fixed thickness such as files, a load capacity of each goods basket unit may be configured in advance according to quantity of orders. It is not expanded herein.

Figure 2:
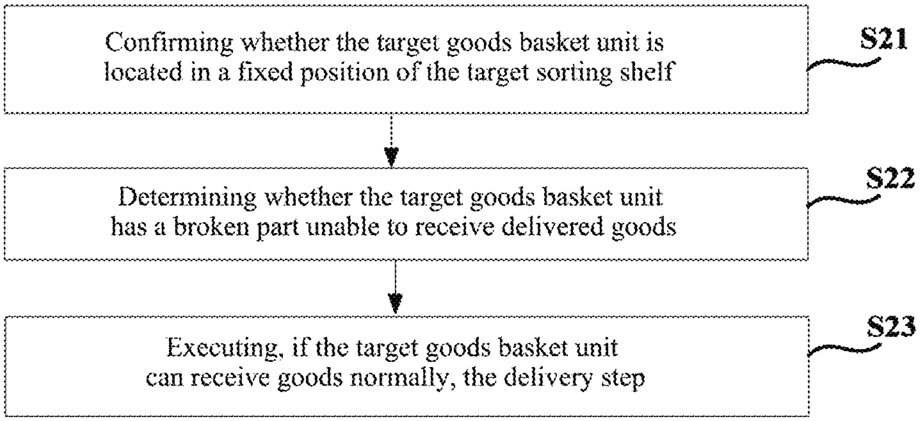
FIG. 2 is a schematic flowchart of the sorting control method for a three-dimensional sorting robot in embodiments of the present disclosure.

Referring to FIG. 2, the step of acquiring a state of a target goods basket unit of a current sorting shelf is configured as follows: S21: confirming whether the target goods basket unit is located in a fixed position of the target sorting shelf, wherein, the fixed position may be position information in a certain target sorting shelf, for example, row three and column five, and row two and column three;

S22: determining, when the target goods basket unit is located in the fixed position, whether the target goods basket unit has a broken part unable to receive delivered goods; and S23: executing, if the target goods basket unit can receive goods normally, the delivery step.

It should be indicated that:

The three-dimensional sorting robot has a binding relationship with identity information of the target sorting shelf, and the binding relationship is associated with a target order. Under sorting tasks of the target order, the three-dimensional sorting robot sorts the to-be-sorted goods according to the identity information of the shelf, wherein the identity information includes a correspondence relationship between order goods and the target goods basket unit;

Execution of a sorting action of the sorting robot needs to be implemented by relying on the fixed position of the goods basket unit. For example, under sorting tasks of a certain order A002, the order A002 has ten thousands of sorting tasks, and under the tasks of the order A002, the three-dimensional sorting robot needs to bind to a target sorting shelf 001 during the sorting so as to complete the goods sorting accurately.

In the three-dimensional sorting system, the three-dimensional sorting shelf generally refers to a shelf structure having at least two or more layers, and goods basket units are regularly arranged in the shelf. Definitely, a specific structure and a specific number of layers of the sorting shelves in the present disclosure are not limited in actual application. Referring to depiction in FIG. 1*c*, in one three-dimensional sorting system, there are a plurality of sorting shelves, for example, a current target sorting shelf is labeled as 001, the identity information thereof at least contains structure data of this sorting shelf, for example, a structure of the shelf No. 001 is 4 rows and 3 columns, after it is recognized by the three-dimensional sorting robot, the to-be-sorted goods need to be delivered into the goods basket unit in row three and column two, then the three-dimensional sorting robot only needs to deliver the goods according to this structure and position. The structure data also may be differentiated according to types of the sorting shelves, for example, X001 type is a rectangular sorting shelf with 4 rows and 3 columns, and Y001 type is a rectangular sorting shelf with 8 rows and 5 columns.

S12: a delivery step, involving controlling, when it is confirmed that the target goods basket unit is available, the unloading mechanism of the three-dimensional sorting robot to execute a first delivery action, wherein, when executing S11, a scanning device or an image acquisition device configured for an unloading device is controlled to perform a first time of scanning or photographing, so as to confirm the state of the goods basket, and when executing S12, the unloading mechanism is controlled to perform a first delivery action. A specific delivery action may be set according to a structure and an action type of the unloading mechanism, and is not limited. For example, the delivery action of the unloading mechanism is to drive, by a motor, a turnover plate or a shovel-shaped plate of the unloading mechanism to pour so as to make the goods delivered.

S13: a determination step, involving determining whether to-be-delivered goods enter the target goods basket unit, and controlling, when a delivery failure occurs, the unloading mechanism of the three-dimensional sorting robot to execute a second delivery action, wherein, during actual delivery, the to-be-delivered goods fail to enter the target good basket unit because the to-be-delivered goods have a too light weight or a too small size, or the unloading mechanism does not pour in place during the delivery. When the delivery failure occurs, a second delivery is performed.

Figure 3:
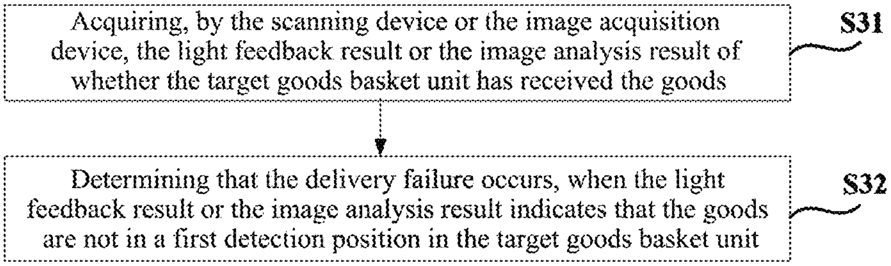
FIG. 3 is a schematic flowchart of the sorting control method for a three-dimensional sorting robot in embodiments of the present disclosure.

Referring to FIG. 3, the step of determining whether to-be-delivered goods enter the target goods basket unit may be preferably performed as follows:

S31: acquiring, by the scanning device or the image acquisition device, the light feedback result or the image analysis result of whether the target goods basket unit has received the goods; and

S32: determining that the delivery failure occurs, when the light feedback result or the image analysis result indicates that the goods are not in a first detection position in the target goods basket unit.

S14: a confirmation step, involving executing the determination step one or more times, until it is confirmed that the to-be-delivered goods are delivered into the target goods basket unit.

Figure 4:
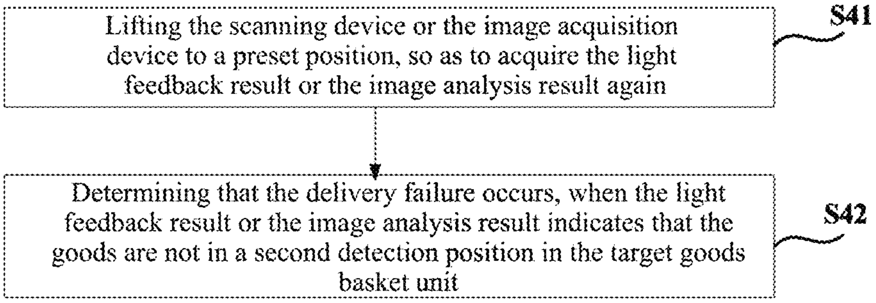
FIG. 4 is a schematic flowchart of the sorting control method for a three-dimensional sorting robot in embodiments of the present disclosure.

Referring to FIG. 4, the confirmation step optionally may be specifically implemented as follows:

S41: lifting the scanning device or the image acquisition device to a preset position by using a lifting function equipped to the unloading mechanism, so as to acquire the light feedback result or the image analysis result again, wherein, the present embodiment is a preferred mode to secondarily confirm whether the goods are delivered. According to statistics of actual delivery failures, due to blocking of an edge height of the sorting goods basket, it is impossible to accurately know whether goods having a small size or volume are delivered, or goods cannot be delivered into the goods basket unit in a pouring manner because a carrying plane of the unloading mechanism and a goods package are stuck. Then it is necessary to elevate a viewing angle or acquire more images so as to complete verification; and

S42: determining that the delivery failure occurs, when the light feedback result or the image analysis result indicates that the goods are not in a second detection position in the target goods basket unit.

Generally, it is necessary to perform 2-3 times of confirmation in cooperation with the manner of light feedback or image analysis, and then it can be confirmed whether the delivery is successful. Specific times of confirmation are set according to characteristics of goods in different industries, and are not limited.

With respect to a sorting principle of the sorting robot, description is given as follows: under the sorting tasks of the target order, the to-be-sorted goods are sorted according to the identity information of the shelf.

In this embodiment, the three-dimensional sorting robot needs to be controlled by the server for orders and sorting tasks to be completed. A sorting target of the three-dimensional sorting robot is goods, and a target position is obtained on the basis of the identity information of the sorting shelf or goods basket above.

In the present embodiment, in order to acquire more detailed information of the sorting shelf, the method further includes: acquiring attribute data of the goods basket units of the sorting shelf, including size data, volume data and type data. In order to allocate the goods baskets to the to-be-allocated goods for facilitating easy sorting, quick sorting and suitable sorting, the sizes, volumes and types of individual goods basket units need to be acquired so as to allocate corresponding sorting tasks.

The to-be-sorted goods in the target order are matched according to the attribute data, so as to generate a correspondence relationship table of the to-be-sorted goods and the goods basket units.

Each of the to-be-sorted goods has a correspondence relationship with one or more goods basket units based on the sorting tasks, and the sorting robot completes precise sorting based on the correspondence relationship.

Prior to the state acquisition step for the target sorting goods basket in FIG. 1*d*, the identity information may be acquired by reading a label provided on the target sorting shelf via RFID, wherein the label at least carries structure data of the sorting shelf and the position information of the goods basket unit.

The structure data of the sorting shelf indicate information of longitudinal and transverse structures and available goods baskets of the sorting shelf.

The position information of the goods basket unit indicates a position of the goods basket unit in a coordinate system formed by the sorting shelf.

The above form of reading via RFID is preferred for configuring movable sorting shelves in the three-dimensional sorting system. When a sorting robot No. 001 receives sorting tasks of a certain order A002, in order to efficiently complete the sorting, 9 movable sorting shelves (Nos. X010-X090) are allocated to the sorting robot No. 001 to complete this order.

When the movable sorting shelves of the X001 type participate in the sorting, the sorting robot No. 001 reads that the target rectangular sorting shelves are of the X001 type (the X001 type is a rectangular sorting shelf with 4 rows and 3 columns) by reading an RFID label of the movable sorting shelf No. X010. By reading, it is acquired that the target rectangular sorting shelf has 12 available goods baskets, which are distributed in four horizontal rows and three vertical columns. The target sorting shelf is divided based on a coordinate system, and the 12 available goods baskets may be respectively labeled as X1Y1 (1,1) representing a goods basket in row one and column one, X1Y2 (1,2) representing a goods basket in row one and column two, until X4Y3 (4,3) representing a goods basket in row four and column three.

It should be particularly indicated that, during the execution of the target order, the order A002, the binding relationship between the three-dimensional sorting robot and the target sorting shelf is unique, that is, after completing the sorting for the movable sorting shelf No. X010, the sorting robot No. 001 performs the sorting for the movable sorting shelf No. X020.

Figure 5:
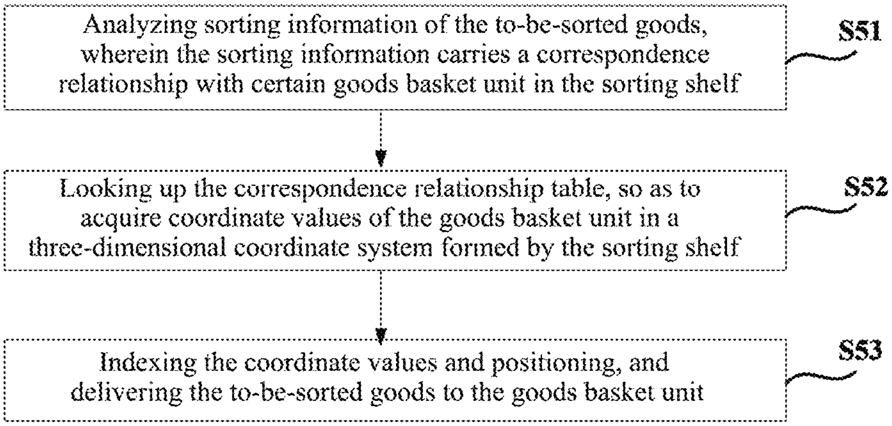
FIG. 5 is a schematic flowchart of the sorting control method for a three-dimensional sorting robot in embodiments of the present disclosure.

Referring to FIG. 5, the sorting step may be implemented as follows:

S51: analyzing sorting information of the to-be-sorted goods, wherein the sorting information carries a correspondence relationship with certain goods basket unit in the sorting shelf;

S52: looking up the correspondence relationship table, so as to acquire coordinate values of the goods basket unit in a three-dimensional coordinate system formed by the sorting shelf; and

S53: indexing the coordinate values and positioning, and delivering the to-be-sorted goods to the goods basket unit.

Certainly, the delivery of certain to-be-sorted goods is not limited to being completed by reading the identity information via the RFID and by looking up the correspondence relationship table.

Figure 6:
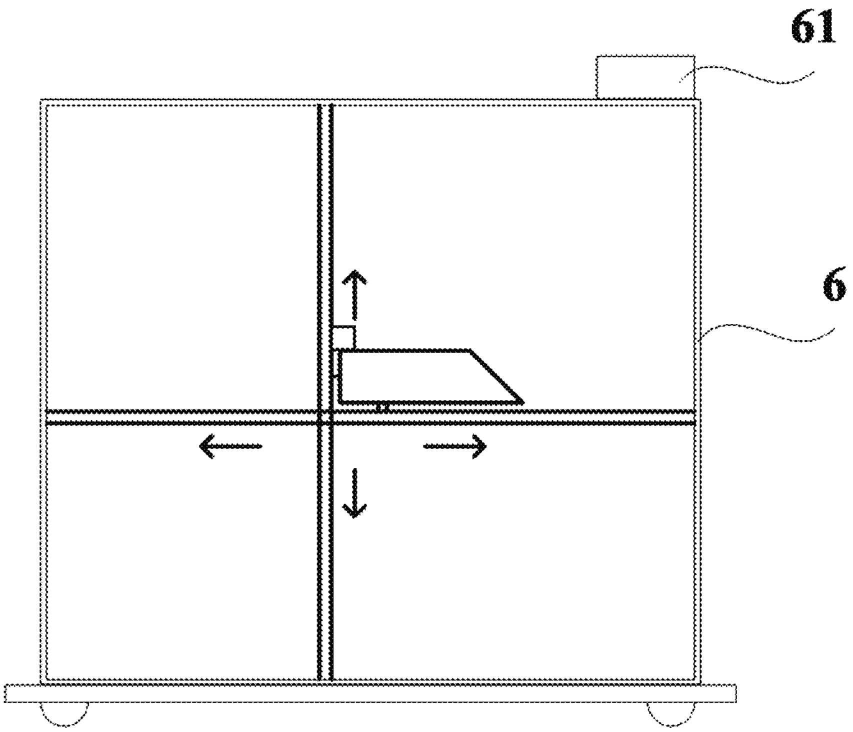
FIG. 6 is a structural schematic diagram based on the three-dimensional sorting robot in embodiments of the present disclosure.

With reference to FIG. 6 and in conjunction with FIG. 1*a*, embodiments of the present disclosure further disclose a three-dimensional sorting robot, configured in the three-dimensional sorting system (referring to depiction in FIG. 1*a*) and having a binding relationship with the identity information of the target sorting shelf, wherein the binding relationship is associated with the target order; under the sorting tasks of the target order, the to-be-sorted goods are sorted according to the identity information of the shelf, wherein the three-dimensional sorting robot is provided with a control module for executing the three-dimensional sorting control method in FIGS. 1*a*-1*d* and FIGS. 2-5.

Since multiple three-dimensional sorting robots simultaneously participate in the sorting within a sorting yard, the three-dimensional sorting robots are arranged in the three-dimensional sorting system through a bus structure. The three-dimensional sorting robots 1 may have a support frame structure, and execute recognition and sorting tasks on the sorting shelves having a multilayer three-dimensional structure through the transverse movable mechanism and the longitudinal movable mechanism. Meanwhile, the three-dimensional sorting robots 1 each may be provided with the rotation plate or the unloading mechanism assembly for delivering goods to the sorting shelves. The scanning device or the image acquisition device is lifted to the preset position by using the lifting function equipped to the unloading mechanism, wherein the scanning device or the image acquisition device may be mounted above a front surface of the turnover plate or the shovel-shaped plate of the unloading mechanism, and is used for scanning or photographing a periphery of the target sorting goods basket and an interior of the goods basket.

The lifting function may, by taking a result of the scanning or photographing as a trigger instruction, drive the unloading mechanism to move, and move vertically and horizontally in a case of delivery failure or requiring confirmation again, so as to acquire another detection position for scanning or photographing or perform more accurate delivery. A hardware structure matching the lifting function as well as a mounting manner of the scanning device or the image acquisition device are configured according to an actual structure of the sorting robots.

Figure 7:
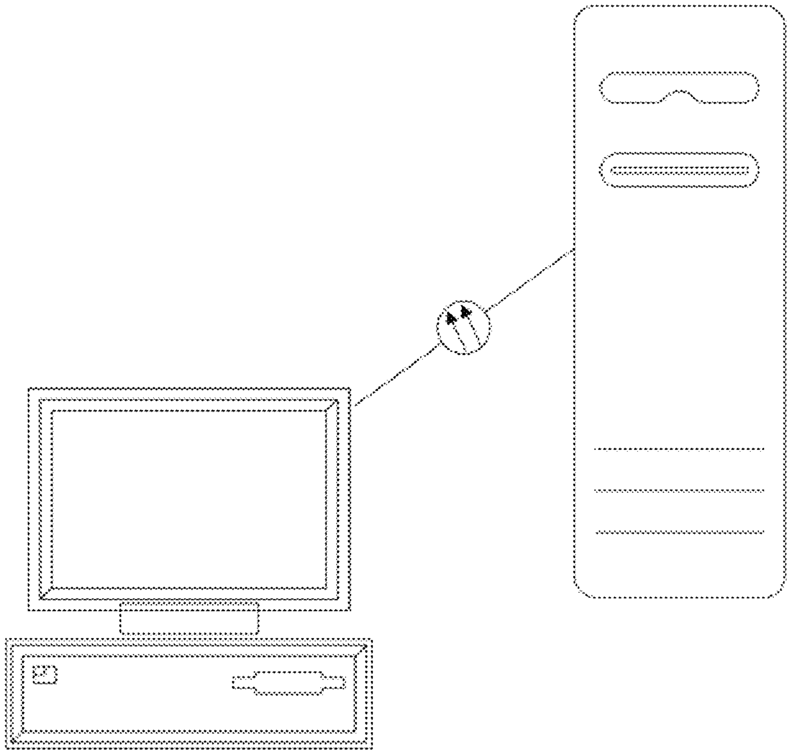
FIG. 7 is a structural schematic diagram of a three-dimensional sorting system in embodiments of the present disclosure.

Referring to FIG. 7, a three-dimensional sorting control system is shown, wherein this system is configured in a three-dimensional sorting system.

The three-dimensional sorting control system executes the above three-dimensional sorting control method shown in and corresponding to FIGS. 1-5. The three-dimensional sorting control system may complete control by one or more groups of servers, and certainly also may be provided with a master computer or a centralized controller, etc. so as to complete sorting task allocation to the three-dimensional sorting robot.

It should be noted that: on a server side, in order to manage waves, orders and completion situation of the orders and collect data, in the present embodiment, the server needs to store identity information of various sorting shelves or goods baskets, and store and update the relationship between the three-dimensional sorting robot and the order in execution, a bound three-dimensional sorting shelf or goods baskets.

Referring to FIG. 1*a*, in the three-dimensional sorting system in the present solution, the sorting robots running on a plane are responsible for delivering the to-be-sorted goods to the sorting mechanisms of the three-dimensional sorting robots, and one three-dimensional sorting system is provided with one or more planar sorting robots to cooperate with the three-dimensional sorting robots, wherein the planar sorting robots execute the goods delivery to the first three-dimensional sorting robots that is based on the target order.

For a specific control method, reference is made to FIGS. 1-5 and descriptions thereof, which is not repeated or redundantly described in the present embodiment.

Figure 8:
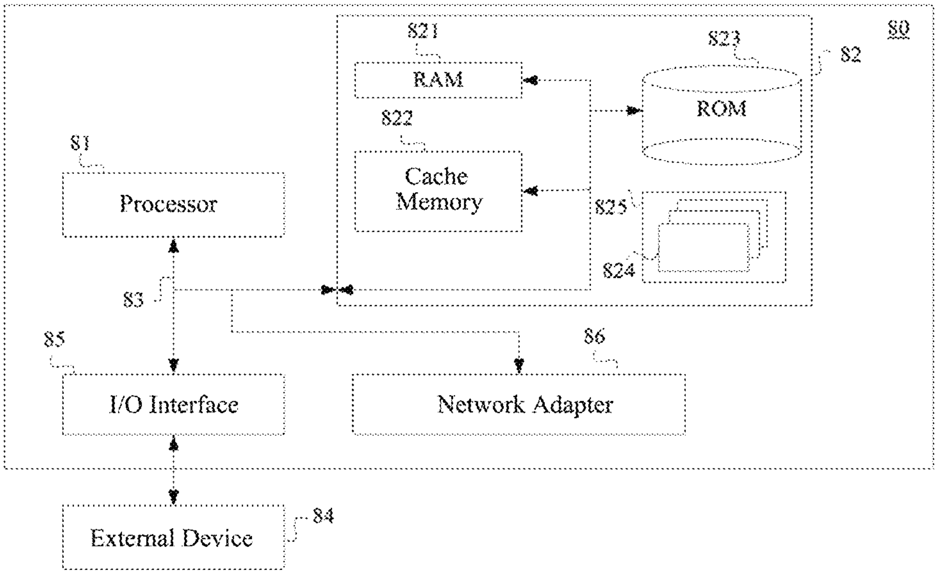
FIG. 8 is a structural schematic diagram of a computing device in embodiments of the present disclosure.

FIG. 8 shows a computing device 80 matching the method of FIGS. 1-5.

It should be noted that the computing device 80 shown in FIG. 8 is merely an example, and shall not bring about any limitation to functions or use scopes of the embodiments of the present disclosure.

As shown in FIG. 8, a preferred server is embodied in the form of a general purpose computing device 80. Components of the computing device 80 may include, but are not limited to, at least one processor 81, at least one memory 82, and a bus 83 connecting different system components (including the memory 82 and the processor 81).

The bus 83 represents one or more of several types of bus structures, including a memory bus or a memory controller, a peripheral bus, a processor or a local bus using any of a variety of bus structures.

The memory 82 may include readable media in the form of volatile memory, such as random access memory (RAM) 821 and/or cache memory 822, and further may include read-only memory (ROM) 823.

The memory 82 further may include a program/utility tool 825 having a set (at least one) of program modules 824, wherein such program module 824 includes, but is not limited to, an operating system, one or more application programs, other program modules and program data, and each of these examples or a certain combination thereof may include implementation of a networking environment.

The computing device 80 also may be in communication with one or more external devices 84 (for example, a keyboard, a pointing device), and also may be in communication with one or more devices that enable a user to interact with the computing device 80, and/or any devices (for example, router, modem) that enable the computing device 80 to be in communication with one or more other computing devices. Such communication may occur via input/output (I/O) interface 85. Furthermore, the computing device 80 also may be in communication with one or more networks (for example, local area network (LAN), wide area network (WAN) and/or a public network such as the Internet) via network adapter 88. As depicted, the network adapter 88 communicates with other modules for the computing device 80 via the bus 83. It should be understood that although not shown in the drawings, other hardware and/or software modules may be used in conjunction with the computing device 80, including, but not limited to: micro-code, device drivers, redundant processors, external disk drive arrays, RAID systems, tape drivers, and data backup storage systems, etc.

In some possible embodiments, the computing device according to the present disclosure may include at least one processor, and at least one memory (such as a first server). In the above, the memory stores program code, and when the program code is executed by the processor, it causes the processor to execute steps in the sorting control method according to exemplary embodiments of the present disclosure described above in the present description.

Figure 9:
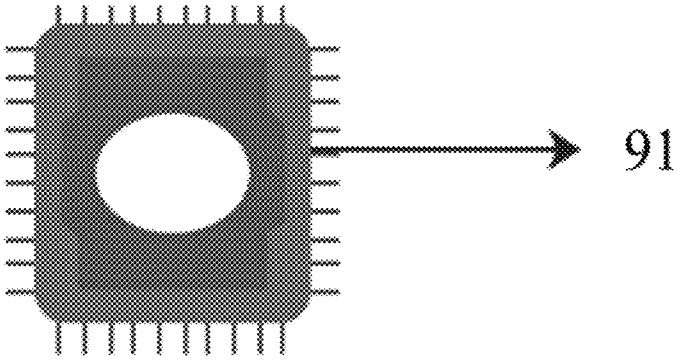
FIG. 9 is a structural schematic diagram of a readable medium in embodiments of the present disclosure.

Referring to FIG. 9, the sorting control method for a three-dimensional sorting robot according to FIGS. 1-5 and corresponding embodiments further may be implemented by a computer readable medium 91. With reference to FIG. 9, a computer-executable instruction, that is, a program instruction that needs to be executed by the three-dimensional sorting control system in the present disclosure, is stored, wherein the computer or high-speed chip can execute instruction to execute the sorting control method for a three-dimensional sorting robot described in the above embodiments.

A readable signal medium may include a data signal with readable program code embodied therein, propagated in baseband or as part of a carrier wave. Such propagated data signal may take any of a variety of forms, including, but not limited to, electro-magnetic signal, optical signal or any suitable combination of the foregoing. The readable signal medium further may be any readable medium that is not a readable storage medium, and the readable medium may send, propagate or transmit a program for use by or in connection with an instruction execution system, apparatus or device.

Program code embodied on the readable medium may be transmitted using any appropriate medium, including, but not limited to, wireless medium, wired medium, optical fiber cable, RF, etc., or any suitable combination of the foregoing.

Program code for carrying out operations of the present disclosure may be written in one programming language or any combination of more programming languages, wherein the programming languages include object oriented programming languages such as Java and C++, and further include conventional procedural programming languages, such as “C” programming language or similar programming languages. The program code may execute entirely on a user’s computing device, partly on the user’s device, as a stand-alone software package, partly on the user’s computing device and partly on a remote computing device, or entirely on a remote computing device or server. In a scenario involving the remote computing device, the remote computing device may be connected to the user’s computing device via any type of network, including local area network (LAN) or wide area network (WAN), or may be connected to an external computing device (for example, connected via the Internet using an Internet Service Provider).

A program product may adopt one or any combination of more readable media. The readable media may be readable signal media or readable storage media. The readable storage media may be, for example, but not limited to, electric, magnetic, optical, electromagnetic, infrared or semiconductor systems, control apparatuses or devices, or any combination of the foregoing. More specific examples (a non-exhaustive list) of the readable storage media include: electric connection having one or more wires, portable discs, hard discs, random access memory (RAM), read-only memory (ROM), erasable programmable read-only memory (EPROM or Flash memory), optical fibers, portable compact disc read-only memory (CD-ROM), optical storage devices, magnetic storage devices, or any suitable combination of the foregoing.

A program product for sorting control of the embodiments of the present disclosure may adopt the portable compact disc read-only memory (CD-ROM) and include program code, and may run on the computing device. However, the program product in the present disclosure is not limited thereto. In the present disclosure, the readable storage media may be any tangible media that contain or store programs for use by or in connection with an instruction execution system, a control apparatus or a device.

The present disclosure is described with reference to the flowcharts and/or the block diagrams of the method, device (system), and the computer program product in the embodiments of the present disclosure. It should be understood that each flow and/or block in the flowcharts and/or the block diagrams, and a combination of the flows and/or the blocks in the flowcharts and/or the block diagrams may be implemented by computer program instructions. These computer program instructions may be provided in a general purpose computer, a special purpose computer, an embedded processor or a processor of other programmable data processing device so as to produce a machine, such that an apparatus configured to implement a function designated in one or more flows in the flowcharts and/or one or more blocks in the block diagrams is produced through instructions executed by the processor of the computer or other programmable data processing devices.

These computer program instructions also may be stored in a computer readable memory capable of directing the computer or other programmable data processing devices to work in a specific manner, such that the instructions stored in the computer readable memory produce a manufactured product including an instruction apparatus, which instruction apparatus implements the function designated in one or more flows of the flowcharts and/or one or more blocks of the block diagrams.

These computer program instructions also may be loaded into computers or other programmable data processing devices, such that a sequence of operation steps are executed on the computers or other programmable devices so as to produce a computer-implemented process, and thereby instructions executed on the computers or other programmable devices provide steps for implementing the functions designated in one or more flows of the flowcharts and/or in one or more blocks of the block diagrams.

To sum up:

The present disclosure discloses the sorting control method for a three-dimensional sorting robot, the three-dimensional sorting robot or the related device, including the state acquisition step, the delivery step, involving executing the first delivery action when it is confirmed that the target goods basket unit is available; the determination step, involving executing the second delivery action when the delivery failure occurs; and the confirmation step, involving executing the determination step once or multiple times, until it is confirmed that the to-be-delivered goods are delivered into the target goods basket unit. By the present sorting control method, in conjunction with cooperation of detection and recognition apparatuses, control apparatus and unloading apparatus of the three-dimensional sorting robot, and through multiple times of confirmation and determination of whether the goods are delivered successfully according to the state of the goods basket units, it is ensured that the three-dimensional sorting robots quickly participate in the sorting, thus achieving the technical objective of greatly improving reliability of successful delivery of the three-dimensional sorting robots while improving the overall sorting efficiency.

Although preferred embodiments of the present disclosure have been described, those skilled in the art could make additional changes and modifications to these embodiments once they learn the basic creative concept. Therefore, the appended claims are intended to be interpreted as including the preferred embodiments as well as all changes and modifications falling within the scope of the present disclosure.

It is apparent that those skilled in the art could make various alterations and variations to the present disclosure without departing from the spirit and scope of the present disclosure. In this way, if these modifications and variations of the present disclosure fall within the scope of the claims of the present disclosure and equivalent technologies thereof, these alterations and variations are also intended to be covered by the present disclosure.

INDUSTRIAL APPLICABILITY

The present disclosure discloses a three-dimensional sorting control method, a three-dimensional sorting robot and a related device. The method includes: a state acquisition step, involving acquiring a state of a target goods basket unit of a current sorting shelf; a delivery step, involving controlling, when it is confirmed that the target goods basket unit is available, an unloading mechanism of the three-dimensional sorting robot to execute a first delivery action; a determination step, involving determining whether to-be-delivered goods enter the target goods basket unit, and controlling, when a delivery failure occurs, the unloading mechanism of the three-dimensional sorting robot to execute a second delivery action; and a confirmation step, involving executing the determination step one or more times, until it is confirmed that the to-be-delivered goods are delivered into the target goods basket unit. The present disclosure ensures that the three-dimensional sorting robots quickly participate in the sorting, thus achieving the technical objective of greatly improving reliability of successful delivery of the three-dimensional sorting robots while improving the overall sorting efficiency.

In addition, it may be understood that the three-dimensional sorting control method, the three-dimensional sorting robot and the related device in the present disclosure are reproducible, and may be applied in a variety of industrial applications. For example, the sorting of the three-dimensional sorting robot, the three-dimensional sorting robot and the related device of the present disclosure may be used in the technical field of sorting robots.

What is claimed is:

1. A sorting control method for a three-dimensional sorting robot, comprising:

a state acquisition step, comprising acquiring a state of a target goods basket unit of a current sorting shelf, wherein the three-dimensional sorting robot has a binding relationship with identity information of the target sorting shelf, and the binding relationship is associated with a target order; under sorting tasks of the target order, to-be-sorted goods are sorted by the three-dimensional sorting robot according to identity information of the shelf, wherein the identity information comprises a correspondence relationship between order goods and the target goods basket unit;

a delivery step, comprising controlling, when it is confirmed that the target goods basket unit is available, an unloading mechanism of the three-dimensional sorting robot to execute a first delivery action;

a determination step, comprising determining whether to-be-delivered goods enter the target goods basket unit, and controlling, when a delivery failure occurs, the unloading mechanism of the three-dimensional sorting robot to execute a second delivery action; and a confirmation step, comprising executing the determination step one or more times, until it is confirmed that the to-be-delivered goods are delivered into the target goods basket unit.

2. The method according to claim 1, wherein the step of acquiring a state of a target goods basket unit of a current sorting shelf is configured as:

confirming whether the target goods basket unit is located in a fixed position of the target sorting shelf, wherein if the target goods basket unit is located in the fixed position, it is determined whether the target goods basket unit has a broken part unable to receive delivered goods, wherein if the target goods basket unit is capable of receiving goods normally, the delivery step is performed.

3. The method according to claim 2, wherein the step of confirming whether the target goods basket unit is located in a fixed position of the target sorting shelf comprises:

acquiring, by a scanning device or an image acquisition device, whether the target goods basket unit is located in the fixed position of the target sorting shelf, wherein if the light feedback result or image analysis result indicates that the target goods basket unit does not exist in the fixed position, the unloading mechanism of the three-dimensional sorting robot is controlled to stop a delivery action.

4. The method according to claim 3, wherein the state acquisition step further comprises: acquiring attribute data of goods basket units of the sorting shelf, wherein the attribute data comprise: size data, volume data and type data.

5. The method according to claim 2, wherein the state acquisition step further comprises: acquiring attribute data of goods basket units of the sorting shelf, wherein the attribute data comprise: size data, volume data and type data.

6. The method according to claim 2, wherein the step of determining whether to-be-delivered goods enter the target goods basket unit comprises:

acquiring, by a scanning device or an image acquisition device, a light feedback result or an image analysis result of whether the target goods basket unit has received the goods, wherein if the light feedback result or the image analysis result indicates that the goods are not in a first detection position in the target goods basket unit, it is determined that the delivery failure occurs.

7. The method according to claim 6, wherein the confirmation step comprises:

lifting the scanning device or the image acquisition device to a preset position by using a lifting function equipped to the unloading mechanism, so as to acquire the light feedback result or the image analysis result again, wherein if the light feedback result or the image analysis result indicates that the goods are not in a second detection position in the target goods basket unit, it is determined that the delivery failure occurs.

8. The method according to claim 6, wherein the step of confirming whether the target goods basket unit is located in a fixed position of the target sorting shelf comprises:

acquiring, by a scanning device or an image acquisition device, whether the target goods basket unit is located in the fixed position of the target sorting shelf, wherein if the light feedback result or image analysis result indicates that the target goods basket unit does not exist in the fixed position, the unloading mechanism of the three-dimensional sorting robot is controlled to stop a delivery action.

9. The method according to claim 6, wherein the state acquisition step further comprises: acquiring attribute data of goods basket units of the sorting shelf, wherein the attribute data comprise: size data, volume data and type data.

10. The method according to claim 7, wherein the state acquisition step further comprises: acquiring attribute data of goods basket units of the sorting shelf, wherein the attribute data comprise: size data, volume data and type data.

11. The method according to claim 1, wherein the state acquisition step further comprises: acquiring attribute data of goods basket units of the sorting shelf, wherein the attribute data comprise: size data, volume data and type data.

12. The method according to claim 1, wherein the three-dimensional sorting robot has a binding relationship with the identity information of the target sorting shelf, and the identity information of the target sorting shelf is acquired by the three-dimensional sorting robot using an RFID reader, comprising:

reading a label provided on the target sorting shelf to acquire the identity information, wherein the label at least carries structure data of the sorting shelf and position information of the goods basket unit, wherein the structure data of the sorting shelf indicates information of longitudinal and transverse structures and available goods baskets of the sorting shelf; and the position information of the goods basket unit indicates a position of the goods basket unit in a coordinate system formed by the sorting shelf.

13. The method according to claim 1, wherein the three-dimensional sorting robot sorting to-be-sorted goods according to the identity information of the shelf comprising:

analyzing sorting information of the to-be-sorted goods, wherein the sorting information carries a correspondence relationship with certain goods basket unit in the sorting shelf;

looking up a correspondence relationship table, so as to acquire coordinate values of the goods basket unit in a three-dimensional coordinate system formed by the sorting shelf; and indexing the coordinate values and positioning, and delivering the to-be-sorted goods to the goods basket unit.

14. A three-dimensional sorting robot, configured in a three-dimensional sorting system, wherein the three-dimensional sorting robot is provided with a control module, for executing the sorting control method for a three-dimensional sorting robot according to claim 1 comprising: a state acquisition step, comprising acquiring a state of a target goods basket unit of a current sorting shelf, wherein the three-dimensional sorting robot has a binding relationship with identity information of the target sorting shelf, and the binding relationship is associated with a target order;

under sorting tasks of the target order, to-be-sorted goods are sorted by the three-dimensional sorting robot according to identity information of the shelf, wherein the identity information comprises a correspondence relationship between order goods and the target goods basket unit;

a delivery step, comprising controlling, when it is confirmed that the target goods basket unit is available, an unloading mechanism of the three-dimensional sorting robot to execute a first delivery action;

a determination step, comprising determining whether to-be-delivered goods enter the target goods basket unit, and controlling, when a delivery failure occurs, the unloading mechanism of the three-dimensional sorting robot to execute a second delivery action; and a confirmation step, comprising executing the determination step one or more times, until it is confirmed that the to-be-delivered goods are delivered into the target goods basket unit.

15. The three-dimensional sorting robot according to claim 14, wherein the three-dimensional sorting robot has a binding relationship with the identity information of the target sorting shelf, and the binding relationship is associated with the target order; under the sorting tasks of the target order, the to-be-sorted goods are sorted according to the identity information of the shelf.

16. The method according to claim 2, wherein the three-dimensional sorting robot has a binding relationship with the identity information of the target sorting shelf, and the identity information of the target sorting shelf is acquired by the three-dimensional sorting robot using an RFID reader, comprising:

reading a label provided on the target sorting shelf to acquire the identity information, wherein the label at least carries structure data of the sorting shelf and position information of the goods basket unit, wherein the structure data of the sorting shelf indicates information of longitudinal and transverse structures and available goods baskets of the sorting shelf; and the position information of the goods basket unit indicates a position of the goods basket unit in a coordinate system formed by the sorting shelf.

17. A three-dimensional sorting control system, configured in a three-dimensional sorting system, the three-dimensional sorting control system comprising:

one or more processors configured to:

acquire a state of a target goods basket unit of a current sorting shelf, wherein a three-dimensional sorting robot has a binding relationship with identity information of a target sorting shelf, and the binding relationship is associated with a target order;

under sorting tasks of the target order, cause to-be-sorted goods to be sorted by the three-dimensional sorting robot according to identity information of the target sorting shelf, wherein the identity information comprises a correspondence relationship between order goods and the target goods basket unit;

control, when it is confirmed that the target goods basket unit is available, an unloading mechanism of the three-dimensional sorting robot to execute a first delivery action;

determine whether to-be-delivered goods enter the target goods basket unit, and control, when a delivery failure occurs, the unloading mechanism of the three-dimensional sorting robot to execute a second delivery action; and repeatedly determine whether the to-be-delivered goods enter the target goods basket until it is confirmed that the to-be-delivered goods are delivered into the target goods basket unit.

18. The three-dimensional sorting control system according to claim 17, wherein the one or more processors are provided by one or more groups of servers, a master computer, or a centralized controller, and are configured to allocate sorting tasks to the three-dimensional sorting robot.

19. The three-dimensional sorting control system according to claim 18, wherein the server stores the identity information of each sorting shelf or goods basket, and stores and updates a relationship between the three-dimensional sorting robot and an order in execution, a bound three-dimensional sorting shelf or goods basket.

20. The three-dimensional sorting control system according to claim 17, wherein the three-dimensional sorting system is provided with one or more planar sorting robots, wherein the planar sorting robots cooperate with the three-dimensional sorting robot, and the planar sorting robots execute goods delivery to the three-dimensional sorting robot based on the target order.

* * * * *